United States Patent
Kim et al.

(10) Patent No.: US 12,499,383 B2
(45) Date of Patent: Dec. 16, 2025

(54) PERSONALIZED NODE RANKING METHOD AND SYSTEM USING RANDOM WALK

(71) Applicant: IUCF-HYU (INDUSTRY-UNIVERSITY COOPERATION FOUNDATION HANYANG UNIVERSITY), Seoul (KR)

(72) Inventors: Sang Wook Kim, Seoul (KR); Yeon Chang Lee, Seoul (KR); Won Chang Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 881 days.

(21) Appl. No.: 17/731,904

(22) Filed: Apr. 28, 2022

(65) Prior Publication Data
US 2022/0351076 A1    Nov. 3, 2022

(30) Foreign Application Priority Data

Apr. 29, 2021   (KR) .......................... 10-2021-0055547
Apr. 27, 2022   (KR) .......................... 10-2022-0052236

(51) Int. Cl.
*G06F 16/901* (2019.01)
*G06N 20/00* (2019.01)

(52) U.S. Cl.
CPC ......... *G06N 20/00* (2019.01); *G06F 16/9024* (2019.01)

(58) Field of Classification Search
CPC .......................... G06N 20/00; G06F 16/9024
See application file for complete search history.

(56) References Cited

U.S. PATENT DOCUMENTS 8,055,664 B2    11/2011  Baluja et al.
9,317,567 B1*    4/2016  Lu ....................... G06F 16/2465
(Continued)

FOREIGN PATENT DOCUMENTS

JP    2014-521115 A    8/2014
KR    10-2010-0051593 A    5/2010
(Continued)

OTHER PUBLICATIONS

Ugander "Balanced Label Propagation . . . " <https://stanford.edu/~jugander/papers/wsdm13-blp.pdf> (Year: 2013).*
(Continued)

*Primary Examiner* — Beau D Spratt
(74) *Attorney, Agent, or Firm* — Sughrue Mion, PLLC

(57) ABSTRACT

Provided is a personalized node ranking (PNR) system and method using random walk. In detail, a personalized ranking method using random walk includes verifying whether propagation of a positive score or a negative score of a currently-visiting node is trustworthy based on an edge sign between a seed node and a next-visiting node predicted by using a classification model, and when the propagation is trustworthy according to the verification, propagating a score by using a first score propagation method based on balance theory, and when the propagation is untrustworthy according to the verification, propagating a score by using a second score propagation method based on a ratio between a balanced triangle and an unbalanced triangle of a signed network.

18 Claims, 10 Drawing Sheets

(56) References Cited

U.S. PATENT DOCUMENTS

| | | |
|---|---|---|
| 11,455,512 B1* | 9/2022 | Al-rfou' .................. G06N 3/08 |
| 2009/0083314 A1* | 3/2009 | Maim ................... G06F 40/194 |
| 2011/0307494 A1* | 12/2011 | Snow .................. G06F 16/9024 |
| | | 707/748 |
| 2013/0311337 A1* | 11/2013 | Stoll ....................... H04L 51/52 |
| | | 705/26.81 |
| 2017/0351740 A1 | 12/2017 | Narayanam et al. |
| 2018/0103111 A1 | 4/2018 | Narayanam et al. |
| 2018/0262694 A1* | 9/2018 | Lee ....................... H04W 48/10 |
| 2019/0155952 A1* | 5/2019 | Tang ................. G06F 16/24578 |

FOREIGN PATENT DOCUMENTS

| | | |
|---|---|---|
| KR | 10-1866866 B1 | 6/2018 |
| KR | 10-2019-0040863 A | 4/2019 |
| KR | 10-2019-0040864 A | 4/2019 |
| KR | 10-2020-0010172 A | 1/2020 |
| KR | 10-2113094 B1 | 5/2020 |
| KR | 10-2021-0059364 A | 5/2021 |
| KR | 10-2021-0066333 A | 6/2021 |
| WO | 2018/152534 A1 | 8/2018 |

OTHER PUBLICATIONS

Jure Leskovec et al., "Predicting Positive and Negative Links in Online Social Networks", WWW '10: Proceedings of the 19th international conference on World wide web, Mar. 2010, 10 pages.
Korean Office Action issued Aug. 30, 2023 in Application No. 10-2022-0052236.

\* cited by examiner

PERSONALIZED NODE RANKING METHOD AND SYSTEM USING RANDOM WALK

CROSS-REFERENCE TO RELATED APPLICATIONS

This application claims priority under 35 U.S.C. § 119 to Korean Patent Application No. 10-2021-0055547 filed on Apr. 29, 2021, and Korean Patent Application No. 10-2022-0052236 filed on Apr. 27, 2022, in the Korean Intellectual Property Office, the disclosures of which are incorporated by reference herein in their entireties.

BACKGROUND

The present disclosure relates to a personalized node ranking method and system, and more particularly, to technology of assigning ranking to nodes through sign verification in a signed network by using random walk.

The personalized node ranking (PNR) problem is, given a seed node in a network, to rank the remaining nodes in an order most related to the seed node by considering the structure of the network. Unlike the traditional node ranking problem that provides global node ranking of a network regardless of a specific node, the PNR problem focuses on a given specific node. Accordingly, solutions to the PNR problem may be utilized in a variety of personalized business applications such as friend recommendation and targeted marketing.

Signed networks with both positive and negative edges between nodes have emerged. For example, product review sites allow users to decide whether users trust or distrust each other. In the signed networks, when users trust each other, it may be represented by positive edges, and when users distrust each other, it may be represented by negative edges. The edge signs provide rich semantics between nodes. However, PNR methods in unsigned networks assume that there are only one type of edges (e.g., positive edges) between nodes, and thus may not consider edge signs in signed networks. To overcome this limitation, PNR methods in which edge signs may be considered have been proposed.

In recently proposed technology, signed random walk models considering edge signs have been designed by extending existing random walk models. First, a random surfer traverses edges in a given network while propagating positive/negative scores of each node to other nodes connected to the node by considering edge signs. In this case, in order to consider the edge signs, the balance theory that is a well-known theory in social science is commonly followed. However, because the technology depends on the balance theory, when edge signs between nodes are incorrectly predicted and thus false positive scores or negative scores are propagated, a ranking result may be inaccurate.

SUMMARY

The present disclosure may provide a random walk-based personalized node ranking (PNR) method and system through sign verification.

The present disclosure may provide a method and system for preventing scores corresponding to false signs from being propagated to nodes, by verifying score propagation of a signed random surfer using the balance theory.

A personalized ranking method performed by a PNR system includes: performing sign verification for determining whether score information including a positive score or a negative score predicted for nodes existing in a signed network at a seed node is trustworthy; and allowing a signed random surfer starting from the seed node to propagate score information including a positive score or a negative score of a previously-visiting node to a visiting node by using any one score propagation method selected according to whether the score information is trustworthy determined through the sign verification.

The performing of the sign verification may include setting, for the nodes existing in the signed network at the seed node, a positive score or a negative score between the seed node and the nodes.

The performing of the sign verification may include predicting sign information between the seed node and a neighboring node by using topological features of a pair of the seed node and the neighboring node, and determining whether the predicted sign information between the seed node and the neighboring node is same as an edge sign of score information propagated to the neighboring node by balanced theory.

The performing of the sign verification may include generating feature vector information including values of a plurality of topological features for the pair of the seed node and the neighboring node, training a logistic regression classifier model based on the generated feature vector information, and predicting sign information of node pairs not connected by edges in the signed network by using the trained logistic regression classifier model.

The performing of the sign verification may include, when it is determined that the predicted sign information between the seed node and the neighboring node is same as the edge sign of the score information propagated to the neighboring node by the balance theory, determining that score propagation of the score information propagated to the neighboring node by the balance theory is trustworthy.

The performing of the sign verification may include, when it is determined that the predicted sign information between the seed node and the neighboring node is not same as the edge sign of the score information propagated to the neighboring node by the balance theory, determining that score propagation of the score information propagated to the neighboring node by the balance theory is untrustworthy.

The propagating of the score information may include allowing the signed random surfer starting from the seed node to propagate the score information including the positive score or the negative score of the previously-visiting node to the visiting node by using a first score propagation method of predicting to be different from an edge sign based on rules of the balance theory or a second score propagation method of predicting to be same as an edge sign contrary to the rules of the balance theory.

The personalized ranking method may include, when an edge sign between the visiting node and the neighboring node is +1, propagating a positive score of the visiting node to a positive score of the neighboring node, when an edge sign between the visiting node and the neighboring node is +1, propagating a negative score of the visiting node to a negative score of the neighboring node, when an edge sign between the visiting node and the neighboring node is −1, propagating a positive score of the visiting node to a negative score of the neighboring node, and when an edge sign between the visiting node and the neighboring node is −1, propagating a negative score of the visiting node to a positive score of the neighboring node.

The propagating of the score information may include determining a ratio for distributing score information of the visiting node, and propagating the score information of the visiting node distributed according to the determined ratio to a positive score and a negative score of the neighboring node adjacent to the visiting node.

The propagating of the score information may include determining a ratio for distributing the score information of the visiting node to the positive score and the negative score of the neighboring node by utilizing a distribution of an edge sign of a triangle in the signed network.

The propagating of the score information may include assigning personalized ranking to the visiting node based on the propagated positive score or negative score.

The propagating of the score information may include considering score information obtained by subtracting the negative score from the positive score of the visiting node as a final ranking score, and outputting the considered final ranking score.

The performing of the sign verification may include moving signed random walk for the nodes existing in the signed network.

A non-transitory computer-readable recording medium may store a computer program for executing the personalized ranking method in the above in the PNR system.

A PNR system includes: a sign verifier configured to perform sign verification for determining whether score information including a positive score or a negative score predicted for nodes existing in a signed network at a seed node is trustworthy; and a score propagator configured to allow a signed random surfer starting from the seed node to propagate score information including a positive score or a negative score of a previously-visiting node to a visiting node by using any one score propagation method selected according to whether the score information is trustworthy determined through the sign verification.

A personalized ranking method using random walk according to an embodiment of the present disclosure includes verifying whether propagation of a positive score or a negative score of a currently-visiting node is trustworthy based on an edge sign between a seed node and a next-visiting node predicted by using a classification model, wherein the seed node, the currently-visiting node, and the next-visiting node are included in a signed network, and when the propagation is trustworthy according to the verification, propagating a score by using a first score propagation method based on balance theory, and when the propagation is untrustworthy according to the verification, propagating a score by using a second score propagation method based on a ratio between a balanced triangle and an unbalanced triangle of the signed network.

A personalized node ranking (PNR) system using random walk according to an embodiment of the present disclosure includes: a receiver configured to receive a signed network; a memory configured to store one or more instructions; and at least one processor configured to execute the one or more instructions to, verify whether propagation of a positive score or a negative score of a currently-visiting node is trustworthy based on an edge sign between a seed node and a next-visiting node predicted by using a classification model, and when the propagation is trustworthy according to the verification, propagate a score by using a first score propagation method based on balance theory, and when the propagation is untrustworthy according to the verification, propagate a score by using a second score propagation method based on a ratio between a balanced triangle and an unbalanced triangle of the signed network, wherein the seed node, the currently-visiting node, and the next-visiting node are included in the signed network.

A computer-readable recording medium according to an embodiment of the present disclosure stores a program for executing an operation of verifying whether propagation of a positive score or a negative score of a currently-visiting node is trustworthy based on an edge sign between a seed node and a next-visiting node predicted by using a classification model, wherein the seed node, the currently-visiting node, and the next-visiting node are included in a signed network, and an operation of, when the propagation is trustworthy according to the verification, propagating a score by using a first score propagation method based on balance theory, and when the propagation is untrustworthy according to the verification, propagating a score by using a second score propagation method based on a ratio between a balanced triangle and an unbalanced triangle of the signed network.

DETAILED DESCRIPTION

Hereinafter, embodiments will be described in detail with reference to the accompanying drawings.

In the specification, the terms "seed node", "currently-visiting node", and "next-visiting node" are used. The seed node, the currently-visiting node, and the next-visiting node may be nodes included in a signed network. The seed node that is a reference node from which random walk starts may refer to a reference node of personalized node ranking (PNR). The seed node may be pre-determined before random walk is performed. The currently-visiting node may refer to a node currently visited by a random surfer. The next-visiting node may refer to a node scheduled to be next visited by the random surfer located at the currently-visiting node.

Also, in the specification, the terms "positive score" and "negative score" are used. The positive score may correspond to a probability that each of nodes other than the seed node is a friend from the viewpoint of the seed node in the signed network. In contrast, the negative score may correspond to a probability that each of nodes other than the seed node is an enemy from the viewpoint of the seed node in the signed network.

Figure 1:
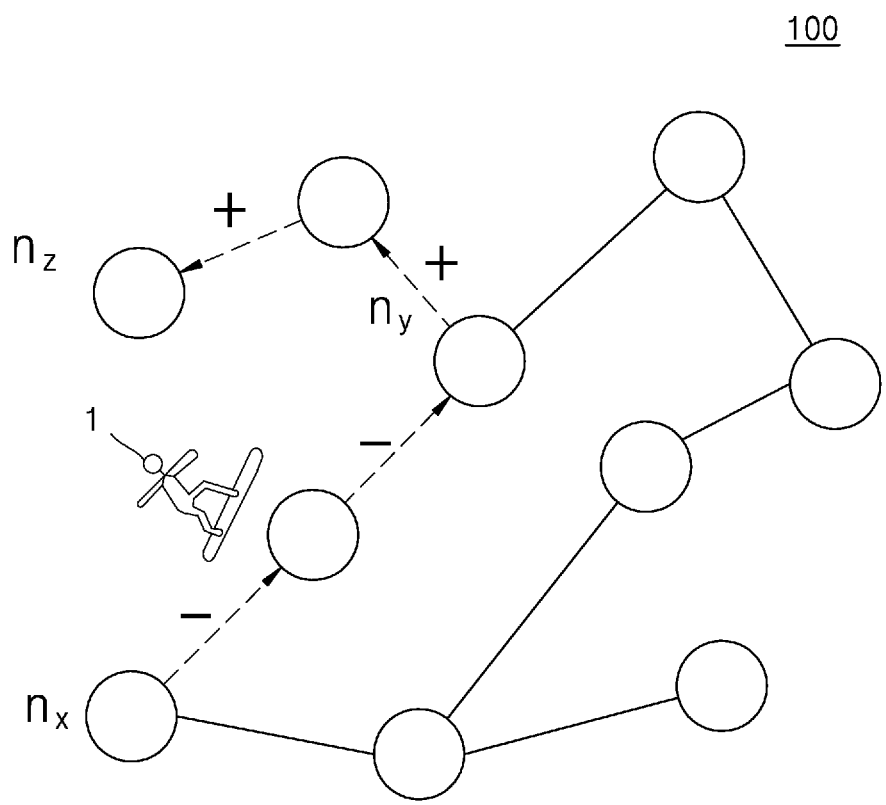
FIG. 1 is a diagram for describing a signed network showing a relationship between nodes.

FIG. 1 is a diagram for describing a signed network showing a relationship between nodes.

The balance theory states that social relationships in the real world follow the following four rules. A friend of my friend is my friend; a friend of my enemy is my enemy; an enemy of my friend is my enemy; and an enemy of my enemy is my friend. When an edge sign is a positive sign, it may indicate a friend, and when an edge sign is a negative sign, it may indicate an enemy.

By the balance theory, signs between nodes that are not directly connected in a signed network 100 may be predicted. Referring to FIG. 1, an edge sign existing in a path until a signed random surfer starting from a seed node $n_x$ visits a specific node (or referred to as a next-visiting node) $n_z$ may be analyzed by the balance theory. The seed node $n_x$ may be an arbitrary or pre-set node included in the signed network 100.

For example, edges between the seed node $n_x$ and the specific node $n_z$ may be two negative edges (−) and two positive edges (+). As a result, according to the balance theory, a sign of an edge $(n_x, n_z)$ of the seed node and the specific node may be predicted as a positive sign. After that (i.e., the positive edge (+)), a score corresponding to the sign predicted by a signed random surfer 1 may be propagated to the specific node.

Referring to FIG. 1, it is assumed that there is a signed network showing a relationship between a plurality of nodes. In this case, although there may be direction information in the signed network, the present disclosure is not limited thereto. When there are two negative edges (−) in one path between a seed node and a specific node, according to the rule of the balance theory that an enemy of my enemy is my friend, a positive score may be propagated to a specific edge. However, in the real world, an enemy of my enemy may not always be my friend. When a path between two nodes is long (e.g., a path between a seed node and a specific node in FIG. 1), there are many edge signs used for prediction, and thus, accurate prediction may be difficult.

An operation of verifying score propagation of a signed random surfer according to the balance theory to prevent a score corresponding to a false sign from being propagated to nodes will be described in embodiments. Also, an operation of ranking nodes likely to be most preferred or nodes likely to be least preferred from among all nodes from the viewpoint of a seed node will be described. According to an embodiment, a PNR system may analyze a structure of a network and an edge sign from the viewpoint of a seed node, and may output ranking of nodes other than the seed node.

Figure 3:
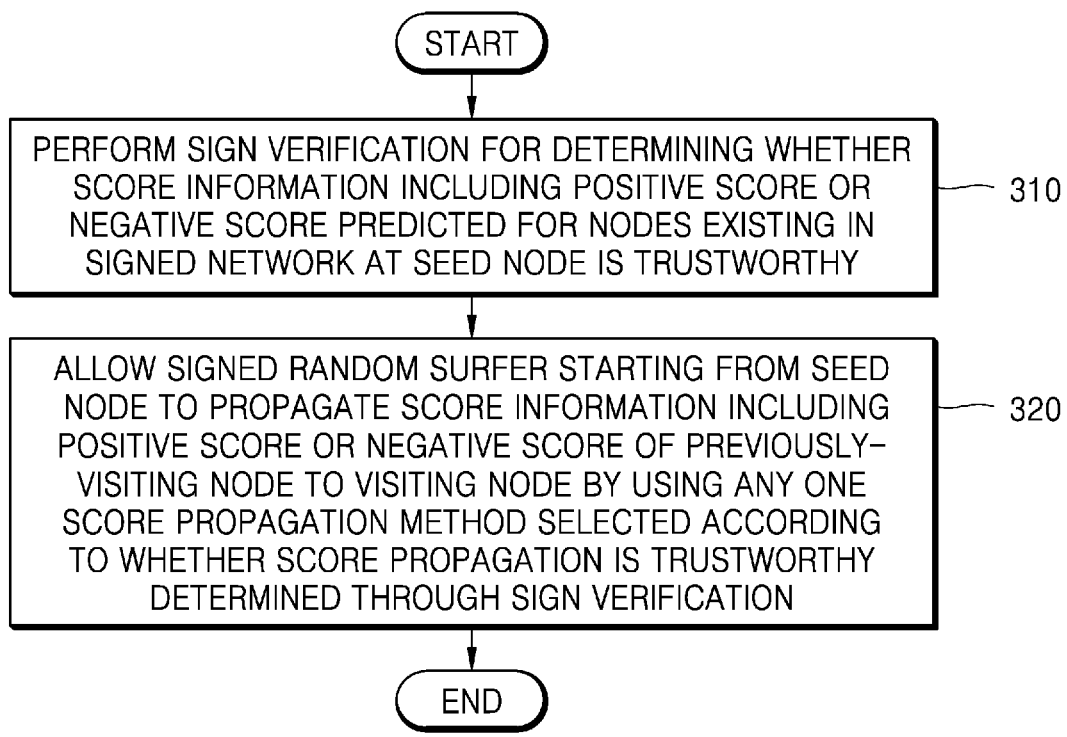
FIG. 3 is a flowchart for describing a PNR method in a PNR system according to an embodiment.

A PNR system 200 may include a processor 210. The processor 210 may include a sign verifier 212 and a score propagator 214. The sign verifier 212 and the score propagator 214 may be different functions performed by the processor 210 according to a control command provided by program code stored in a memory (not shown) of the PNR system 200. The processor 210 and elements of the processor may control the PNR system to perform operations 310 and 320 included in a PNR method of FIG. 3. In this case, the processor 210 and the elements of the processor may be implemented to execute instructions according to code of at least one program and code of an operating system included in the memory (not shown).

The processor 210 may load program code stored in a file of a program for the PNR method into the memory. For example, when a program is executed in the PNR system, the processor may control the PNR system to load program code from a file of the program into the memory under the control of the operating system. In this case, the sign verifier 212 and the score propagator 214 may be different functions of the processor for performing operations 310 and 320 after executing commands of corresponding parts of the program code loaded into the memory (not shown).

In operation 310, the sign verifier 212 may perform sign verification for determining whether score information including a positive score or a negative score predicted for nodes existing in a signed network at a seed node is trustworthy. The sign verifier 212 may perform signed random walk by a random surfer for the nodes existing in the signed network. The sign verifier 212 may set a positive score or a negative score between the seed node and nodes other than the seed node, for the nodes existing in the signed network. The sign verifier 212 may predict an edge sign between the seed node and the nodes other than the seed node. Fr example, the sign verifier 212 may predict an edge sign between the seed node and a specific node by using topological features for a node pair including the seed node and the specific node, and may determine whether the predicted edge sign between the seed node and the specific node is the same as an edge sign of score information propagated to the specific node by the balance theory.

The sign verifier 212 may predict an edge sign for node pairs not connected by edges in the signed network by using a trained classification model. In an embodiment, the classification model may be a logistic regression classifier model. The trained logistic regression classifier model may be trained by using, as an input, feature vector information including values corresponding to a plurality of topological features for a node pair with an edge sign. In an embodiment, the sign verifier 212 may calculate a confidence score of the predicted edge sign by using the trained classification model. For example, a value of the confidence score may be an integer from 0 to 1. As a value of the confidence value increases, it may mean that the reliability of the predicted edge sign increases.

When the predicted edge sign between the seed node and the specific node is the same as the edge sign of the score information propagated to the specific node by the balance theory, the sign verifier 212 may determine that score propagation of the score information propagated to the specific node by the balance theory is trustworthy. When the predicted edge sign between the seed node and the specific node is not the same as the edge sign of the score information propagated to the specific node by the balance theory, the sign verifier 212 may determine that score propagation to the specific node by the balance theory is untrustworthy.

In an embodiment, even when the predicted edge sign between the seed node and the specific node is the same as the edge sign of the score information propagated to the specific node by the balance theory, if the confidence score is less than a pre-set threshold value, the sign verifier 212 may determine that score propagation to the specific node by the balance theory is untrustworthy.

In operation 320, the score propagator 214 may allow the signed random surfer starting from the seed node to propagate score information including a positive score or a negative score of a currently-visiting node to a next-visiting node by using any one score propagation method selected according to whether score propagation is trustworthy determined through the sign verification. The score propagator 214 may allow the signed random surfer starting from the seed node to propagate score information including a positive score or a negative score of a currently vising node to a next-visiting node by using a first score propagation method of propagating a score based on the rules of the balance theory when the score propagation is trustworthy or a second score propagation method of propagating a score based on a ratio between a balanced triangle and an unbalanced triangle of a network when the score propagation is untrustworthy. Assuming that the first score propagation method is used, when an edge sign between the currently-visiting node and the next vising node is + and a positive score of the currently-visiting node is propagated, the score propagator 214 may propagate the positive score of the currently-visiting node to a positive score of the next-visiting node; when an edge sign between the currently-visiting node and the next-visiting node is + and a negative score of the currently-visiting node is propagated, the score propagator 214 may propagate the negative score of the currently-visiting node to a negative score of the next-visiting node; when an edge sign between the currently-visiting node and the next-visiting node is − and a positive score of the currently-visiting node is propagated, the score propagator 214 may propagate the positive score of the currently-visiting node to a negative score of the next-visiting node; and when an edge sign between the currently-visiting node and the next-visiting node is − and a negative score of the currently-visiting node is propagated, the score propagator 214 may propagate the negative score of the currently-visiting node to a positive score of the next-visiting node.

Assuming that the second score propagation method is used, the score propagator 214 may propagate a positive score of the currently-visiting node according to a pre-determined distribution ratio to a positive score and a negative score of the next-visiting node. Alternatively, the score propagator 214 may propagate a negative score of the currently-visiting node according to a pre-determined distribution ratio to a positive score and a negative score of the next-visiting node. In this case, the score propagator 214 may determine a ratio for distributing score information of the currently-visiting node to a positive score and a negative score of the next-visiting node by using a ratio (or distribution) of a balanced triangle and an unbalanced triangle in the signed network. The score propagator 214 may assign personalized ranking to nodes included in the signed network from the viewpoint of the seed node based on the propagated positive score or negative score. The score propagator 214 may calculate score information obtained by subtracting a negative score from a positive score of the visiting node as a final ranking score and may output the calculated final ranking score.

Figure 4:
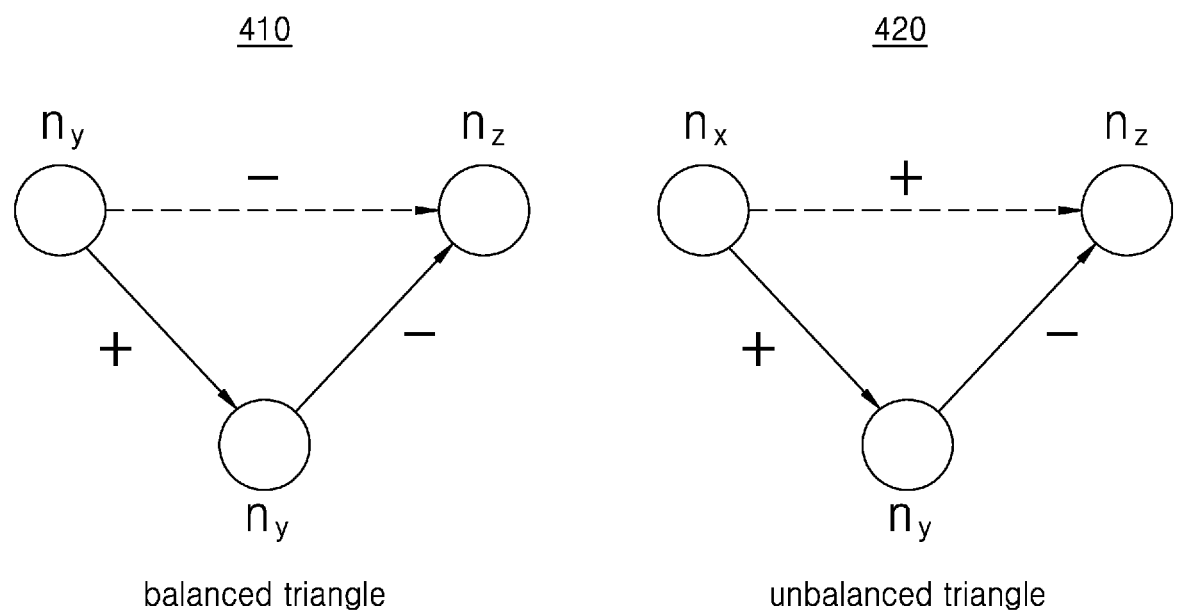
FIG. 4 is a diagram for describing a balanced triangle and an unbalanced triangle, in an embodiment.

FIG. 4 is a diagram for describing a balanced triangle and an unbalanced triangle, in an embodiment.

In real-world signed networks, relationships often do not follow the rules of the balance theory. To show the evidence of the claim, in a real-world signed network, a triangle ($n_x$, $n_y$, $n_z$) in which edge directions between three nodes satisfy transitivity may be searched. In the triangle ($n_x$, $n_y$, $n_z$), when $n_x$ points to $n_y$, $n_y$ points to $n_z$, and $n_x$ points to $n_z$, it may mean that the triangle satisfies transitivity.

It may be examined how much all of the triangles ($n_x$, $n_y$, $n_z$) follow the rules of the balance theory. For example, when given signs (i.e., prior signs) of an edge ($n_x$, $n_y$) and an edge ($n_x$, $n_z$) in the triangle ($n_x$, $n_y$, $n_z$) are respectively + and −, the triangle may be classified into a triangle (i.e., balanced triangle) following the balance theory and a triangle (i.e., unbalanced triangle) not following the balance theory according to a sign (e.g., posterior sign) of the remaining one edge ($n_y$, $n_z$). When the posterior sign is −, the triangle becomes a balanced triangle 410, and the posterior signal is +, the triangle becomes an unbalanced triangle 420.

TABLE 1

| | Prior | (+, +) | | (+, −) | | (−, +) | | (−, −) | |
|---|---|---|---|---|---|---|---|---|---|
| Triangles | Posterior | + | − | + | − | + | − | + | − |
| Dataset | Wikipedia | 92% | 8% | 72% | 28% | 62% | 38% | 50% | 50% |
| | Slashdot | 98% | 2% | 34% | 66% | 58% | 42% | 54% | 46% |
| | Epinions | 99% | 1% | 38% | 62% | 53% | 47% | 41% | 59% |
| | Balanced? | ○ | X | X | ○ | X | ○ | ○ | X |

Table 1 shows ratios between balanced triangles and unbalanced triangles among all triangles in signed networks formed by datasets (Wikipedia, Slashdot, and Epinions), according to four types of prior signs (e.g., (+, +), (+, −), (−, +), and (−, −)). First, it is found that (+, +) type follows the rules of the balance theory in most cases (e.g., a friend of my friend is my friend). In contrast, it is found that the remaining three types ((+, −), (−, +), and (−, −)) do not follow the rules of the balance theory in many cases. For example, for (+, −) type in Wikipedia, the proportion (=72%) of unbalanced triangles is much greater than the proportion (=28%) of balanced triangles. These results indicate that in real-world signed networks, relationships often do not follow the balance theory. That is, an original signed surfer model blindly following the balance theory may cause incorrect sign prediction. Accordingly, according to an embodiment of the present disclosure, incorrect sign prediction by the balance theory may be corrected, thereby improving the accuracy of sign prediction.

Figure 5:
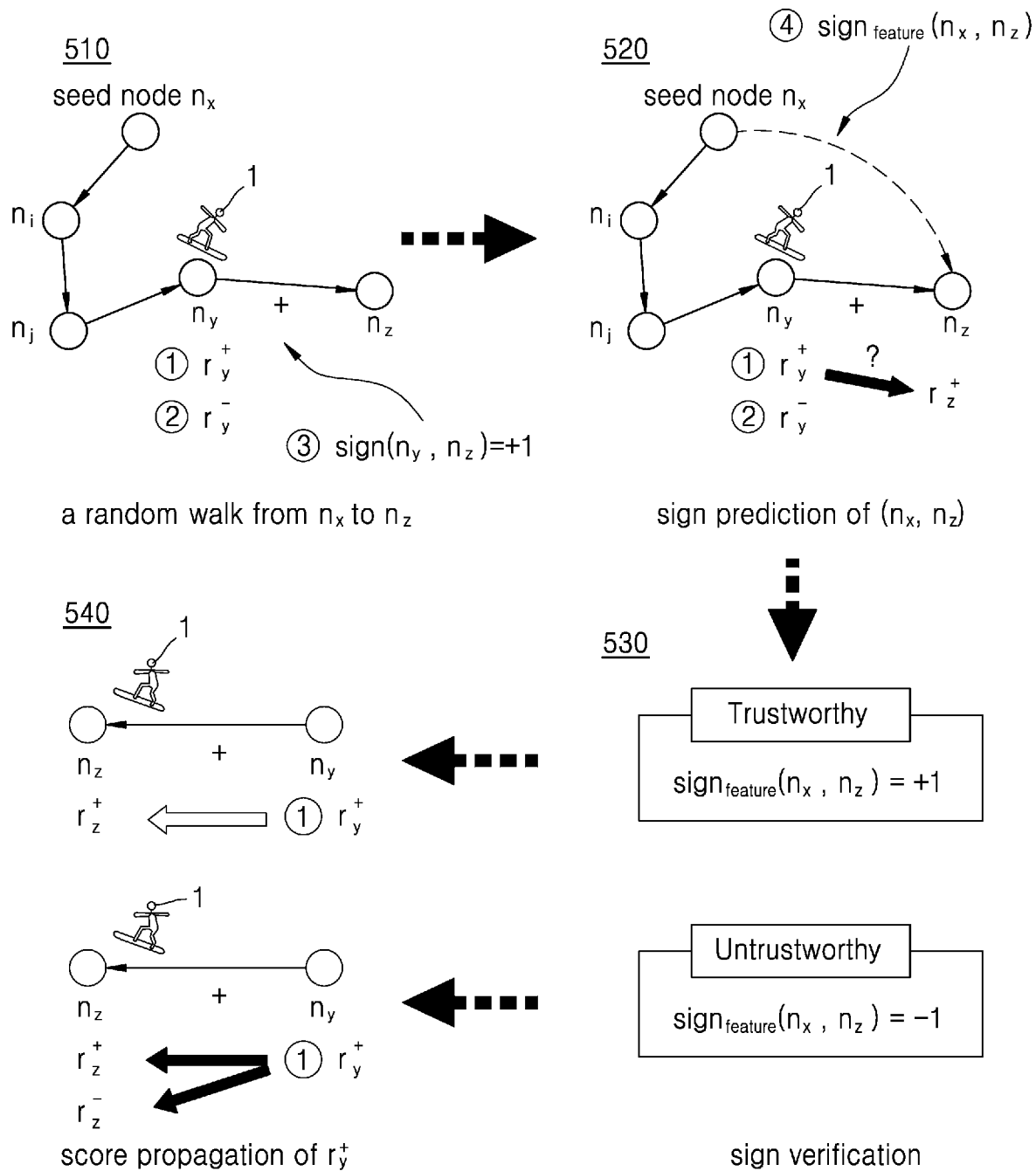
FIG. 5 is a diagram for describing a score propagation operation of a PNR system, in an embodiment.

FIG. 5 is a diagram for describing a score propagation operation of a PNR system, in an embodiment.

Figure 2:
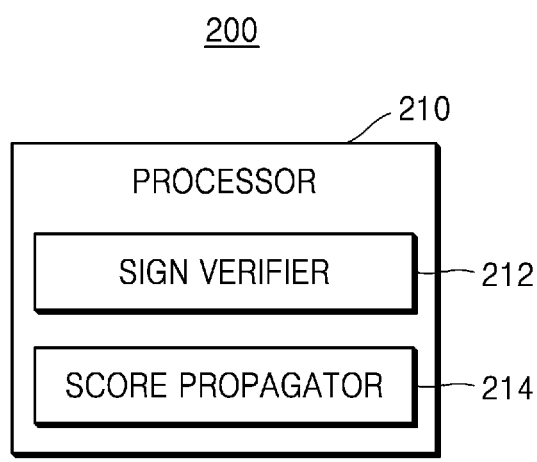
FIG. 2 is a block diagram for describing a configuration of a personalized node ranking (PNR) system according to an embodiment.

Referring to FIG. 5 together with FIG. 2, when a seed node $n_x$ is given, the PNR system 200 may set a positive score and a negative score for all nodes (e.g., $n_y$) existing in a signed network from the viewpoint of the seed node $n_x$. In this case, the positive score indicates a degree to which a relationship between the seed node $n_x$ and all of the nodes (e.g., $n_y$) has a positive sign. The negative score indicates a degree to which a relationship between the seed node $n_x$ and all of the nodes (e.g., $n_y$) has a negative sign. When x=y, initial values of the positive score and the negative score may be respectively set to 1 and 0, and otherwise, both may be set to 0.

The PNR system 200 may propagate scores of the seed node $n_x$ to all of the other nodes (e.g., $n_y$). Basically, in the PNR system, the signed random surfer 1 may start from the seed node $n_x$ and may walk to a next-visiting node $n_z$ with a probability of 1−a, and may return to the seed node $n_x$ with a probability of a (or referred to as a restart probability). In this case, a may be a pre-determined value, or may be empirically determined.

Referring to FIG. 4, a process of propagating a score when the signed random surfer 1 performs one walk to a neighboring node with a probability of 1−α will be described. In a random walk step 510, the signed random surfer 1 visits a currently-visiting node $n_y$, and a positive score $r_y^+$ and a negative score $r_y^-$ of the currently-visiting node $n_y$ have already been propagated from a previously-visiting node $n_j$ by a score propagation method.

In this case, the signed random surfer 1 may propagate the positive score $r_y^+$ and the negative score $r_y^-$ of the currently-visiting node $n_y$ to the next-visiting node $n_z$ while walking from the currently-visiting node to a next-visiting node $n_z$ adjacent to the currently-visiting node $n_y$ with a probability of $1-\alpha$. In this case, an operation of propagating the positive score and an operation of propagating the negative score are similar to each other, and thus, an operation of propagating the positive score will be described as an example.

When an actual edge sign ($n_y$, $n_z$) between the currently-visiting node $n_y$ and the next-visiting node $n_z$ is a positive sign, the positive score $r_y^+$ of the currently-visiting node $n_y$ may be propagated to a positive score $r_z^+$ of the next-visiting node $n_z$. Likewise, when the actual edge sign sign($n_y$, $n_z$) between the currently-visiting node $n_y$ and the next-visiting node $n_z$ is a negative sign, the positive score of the currently-visiting node $n_y$ may be propagated to a negative score $r_z^-$ of the next-visiting node $n_z$. The positive score of the currently-visiting node $n_y$ is propagated to the positive score $r_z^+$ or the negative score $r_z^-$ of the next-visiting node $n_z$ because it depends on the rule of the balance theory that a friend of my friend is my friend and the rule of the balance theory that an enemy of my friend is my enemy. However, as described above, when the balance theory is blindly followed, incorrect sign prediction may be caused.

Accordingly, in embodiments of the present disclosure, the PNR system 200 may verify whether it is trustworthy to propagate the positive score $r_y^+$ of the currently-visiting node $n_y$ depending on the balance theory by additionally predicting a sign of the seed node $n_x$ and the next-visiting node $n_z$.

The PNR system 200 may predict an edge sign $sign_{feature}$($n_x$, $n_z$) between the seed node $n_x$ and the next-visiting node $n_z$ by utilizing topological features for a pair of the seed node $n_x$ and the next-visiting node $n_z$ (sign prediction step 520). A method by which the PNR system 200 predicts the edge sign $sign_{feature}$($n_x$, $n_z$) between the seed node $n_x$ and the next-visiting node $n_z$ has been described with reference to FIGS. 2 and 3, and thus, a description thereof will be omitted.

The PNR system 200 may verify whether the predicted edge sign $sign_{feature}$($n_x$, $n_z$) between the seed node $n_x$ and the next-visiting node $n_z$ is the same as a sign of score information (e.g., the positive score $r_y^+$) propagated to the next-visiting node $n_z$ by the balance theory (sign verification step 530). When the predicted edge sign $sign_{feature}$($n_x$, $n_z$) between the seed node $n_x$ and the next-visiting node $n_z$ is the same as the score information (e.g., the positive score $r_y^+$) propagated to the next-visiting node $n_z$ by the balance theory, the PNR system 200 may determine that score propagation of the positive score $r_y^+$ of the currently-visiting node $n_y$ by the balance theory is trustworthy and may perform score propagation (score propagation step 540).

In contrast, when the predicted edge sign $sign_{feature}$($n_x$, $n_z$) between the seed node $n_x$ and the next-visiting node $n_z$ is not the same as the score information (e.g., the positive score $r_y^+$) propagated to the next-visiting node $n_z$ by the balance theory, the PNR system 200 may determine that score propagation of the positive score of the currently-visiting node $n_y$ by the balance theory is untrustworthy. When it is determined that score propagation is untrustworthy, the PNR system 200 does not propagate the positive score $r_y^+$ of the currently-visiting node $n_y$ only to a score corresponding to a specific sign (e.g., the positive score $r_z^+$ of the next-visiting node $n_z$). The PNR system 200 may distribute the positive score $r_y^+$ of the currently-visiting node $n_y$ to both the positive score $r_z^+$ and the negative score $r_z^-$ of the next-visiting node $n_z$.

In this case, in order to determine a distribution ratio, a ratio of a balanced triangle and an unbalanced triangle in the signed network may be used (Table 1). An example of using a ratio between a balanced triangle and an unbalanced triangle in a signed network will be described in more detail with reference to FIG. 8. Likewise, an operation of propagating the negative score $r_y^-$ of the currently-visiting node $n_y$ may be performed in the same manner as an operation of propagating the positive score $r_y^+$ described above.

An operation of propagating score information (positive score/negative score) of the currently-visiting node $n_y$ to score information of the next-visiting node $n_z$ through one random walk has been described. In an embodiment, in the PNR system 200, in one iterative process, each node propagates a score through its outgoing edge, and receives a score through its incoming edge. As the process is repeatedly performed, all nodes receive a score of the seed node $n_x$. In this case, score propagation may be repeatedly performed until positive scores and negative scores of all nodes (visiting nodes) are converged.

The PNR system 200 may calculate scores obtained by subtracting negative scores from positive scores of visiting nodes as final ranking scores, and may output ranking based on the calculated final ranking scores.

In detail, in the PNR system 200, it is assumed that the signed random surfer 1 is currently at one node (the currently-visiting node $n_y$), and walks to a neighboring node (i.e., the next-visiting node $n_z$) of the currently-visiting node $n_y$ with a probability of $1-\alpha$.

The PNR system 200 may predict the edge sign $sign_{feature}$ ($n_x$, $n_z$) between the feature seed node $n_x$ and the next-visiting node $n_z$ by using topological feature between the seed node $n_x$ and the next-visiting node $n_z$, and may verify whether score propagation by the balance theory based on the predicted edge sign $sign_{feature}$($n_x$, $n_z$) between the seed node and the next-visiting node is trustworthy. For example, FExtra that is a feature-based sign prediction method may be used. For example, the PNR system 200 may generate vector information $x_y z = (x_1, \ldots, x_{23})$ including values for a plurality of topological features, for all node pairs ($n_y$, $n_z$) of the signed network.

Topological features may be used to predict an edge sign from a first node to a second node. The topological features may correspond to surrounding information between the first node and the second node included in a node pair. In an embodiment, the topological features may include a first feature class and/or a second feature class.

The first feature class may be related to degrees of nodes. For example, the first feature class may include at least one of the number of outgoing positive edges of the first node, the number of outgoing negative edges of the first node, the number of incoming positive edges of the second node, the number of incoming negative edges of the second node, the number of common neighboring nodes of the first node and the second node, the total number of outgoing edges of the first node, and the total number of incoming edges of the second node. However, the present disclosure is not limited thereto, and the first feature class may further include arbitrary features related to degrees of nodes.

The second feature class may be related to information of a triad. The triad may include a first node, a second node, and a common neighboring node between the first node and the second node. For example, the second feature class may include information between the first node and the common neighboring node, and information between the second node and the common neighboring node. The information between the first node and the common neighboring node may include an edge sign and an edge direction between the first node and the common neighboring node. Likewise, the information between the second node and the common neighboring node may include an edge sign and an edge direction between the second node and the common neighboring node. However, the present disclosure is not limited thereto, and the second feature class may further include arbitrary features related to information of a triad.

In an embodiment, the PNR system may train a logistic regression classifier model based on feature vectors for all node pairs $(n_y, n_z)$ with actual edge signs in the signed network. For example, the PNR system 200 may predict sign information $sign_{feature}(n_x, n_z)$ for node pairs $(n_x, n_z)$ not connected by edges in the signed network by using the trained logistic regression classifier model. In a prediction process, a confidence score $C(sign_{feature}(n_x, n_z))$ of the predicted sign information $sign_{feature}(n_x, n_z)$ may be calculated. When the confidence score $C(sign_{feature}(n_x, n_z))$ is high, it may mean that the reliability of the predicted sign information $sign_{feature}(n_x, n_z)$ is high. Although an embodiment of using the logistic regression classifier model is described herein, any classification model capable of predicting the sign information $sign_{feature}(n_x, n_z)$ may be used.

In an embodiment, before a signed random walk process is performed, the sign information $sign_{feature}(n_x, n_z)$, for all node pairs $(n_x, n_z)$ not connected by edges may be pre-predicted in a pre-processing task. In other words, whenever sign verification is performed, sign information for all node pairs is not predicted. The sign information $sign_{feature}(n_x, n_z)$ for a pair of connected nodes is considered as the edge sign $sign(n_y, n_z)$ between the currently-visiting node and the next-visiting node, and a confidence score thereof may be set to a highest value (e.g., 1).

Figure 6:
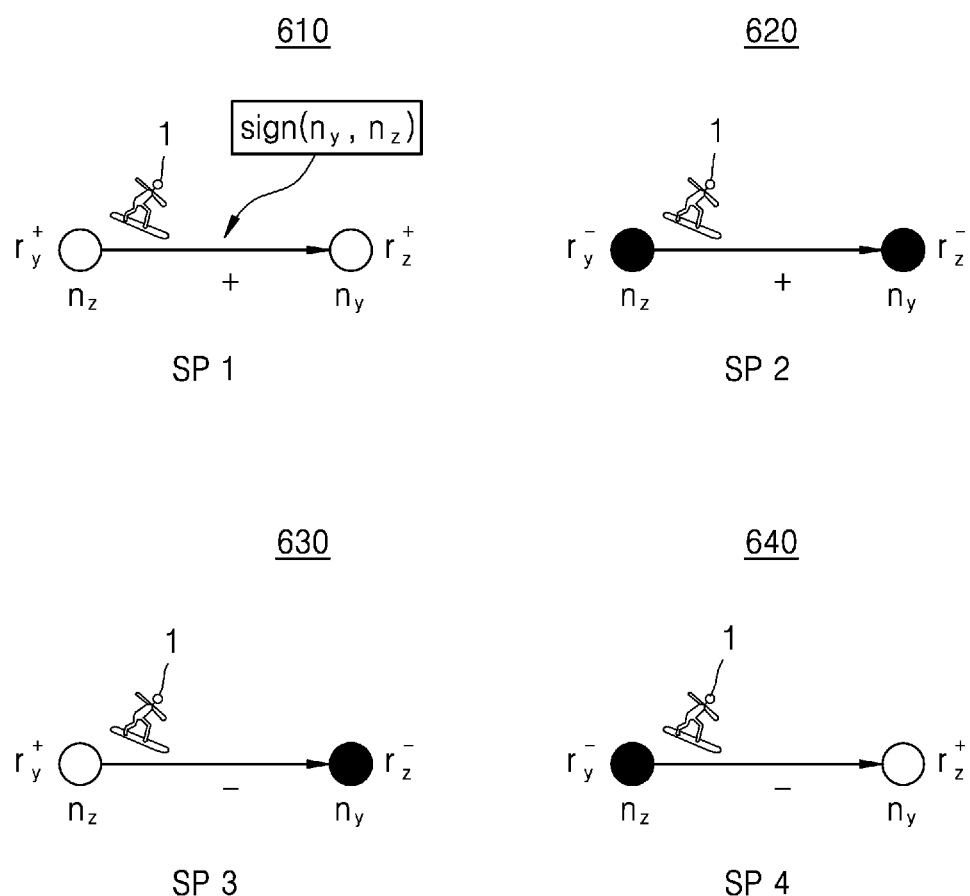
FIG. 6 is a diagram for describing a score propagation method when score propagation is trustworthy, in an embodiment.

The PNR system 200 may verify score propagation, before a positive score and a negative score of the currently-visiting node $n_y$ are propagated to a specific score (positive score/negative score) of the next-visiting node $n_z$. Referring to FIG. 6, when it is verified that score propagation is trustworthy, a score propagation operation from the currently-visiting node $n_y$ to the next-visiting node $n_z$ performed by the PNR system 200 may be as follows.

In SP1 610, when the edge sign between the currently-visiting node and the next-visiting node is $sign(n_y, n_z))=+1$, a positive score of the currently-visiting node $n_y$ may be propagated to a positive score of the next-visiting node $n_z$. In SP2 620, when the edge sign between the currently-visiting node and the next-visiting node is $sign(n_y, n_z))=+1$, a negative score of the currently-visiting node $n_y$ may be propagated to a negative score of the next-visiting node $n_z$. In SP3 630, when the edge sign between the currently-visiting node and the next-visiting node is $sign(n_y, n_z))=-1$, a positive score of the currently-visiting node $n_y$ may be propagated to a negative score of the next-visiting node $n_z$. In SP4 640, when the edge sign between the currently-visiting node and the next-visiting node is $sign(n_y, n_z))=-1$, a negative score of the currently-visiting node $n_y$ may be propagated to a positive score of the next-visiting node $n_z$.

In an embodiment, it may be considered whether the predicted edge sign $sign_{feature}(n_x, n_z)$ is the same as a sign of a score propagated to the next-visiting node $n_z$. For example, it is assumed that the predicted edge sign $sign_{feature}(n_x, n_z)$ is a positive sign. In this case, referring to SP1 610 and SP4 640, because the predicted edge sign $sign_{feature}(n_x, n_z)$ is a positive sign and a sign of a propagated score is a positive sign (i.e., the propagated score is a positive score), the PNR system 200 may determine that score propagation is trustworthy. In contrast, referring to SP2 620 and SP3 630, because the predicted edge sign $sign_{feature}(n_x, n_z)$ is a positive sign and a sign of a propagated score is a negative sign (i.e., the propagated score is a positive score), the PNR system 200 may determine that score propagation is untrustworthy.

In an embodiment, for verification of score propagation, two conditions may be considered. That is, in addition to whether the predicted edge sign $sign_{feature}(n_x, n_z)$ is the same as a sign of a propagated score, whether the confidence score $C(sign_{feature}(n_x, n_z))$ exceeds a pre-determined threshold value may be further considered. In other words, when the predicted edge sign $sign_{feature}(n_x, n_z)$ is the same as a sign of a score to be propagated to the next-visiting node and the predicted edge sign $sign_{feature}(n_x, n_z)$ is trustworthy, the PNR system 200 may trust score propagation. In other words, a condition for the predicted edge sign $sign_{feature}(n_x, n_z)$ (i.e., the confidence score $C(sign_{feature}(n_x, n_z)$ exceeds a threshold value) is not satisfied, the PNR system 200 may determine that there is no information for verifying score propagation and may not trust score propagation. In an embodiment, a threshold value corresponding to a confidence score for a positive sign and a threshold value corresponding to a confidence score for a negative sign may be different from each other.

In summary, only when the confidence score $C(sign_{feature}(n_x, n_z))$ is higher than a pre-set threshold value and the predicted edge sign $sign_{feature}(n_x, n_z)$ is the same as an edge sign of a score propagated to the next-visiting node, the PNR system 200 may trust propagation of a score of the currently-visiting node to the next-visiting node.

The PNR system 200 according to an embodiment may filter uncertain score propagation by the balance theory. When score propagation is not verified unlike in the present disclosure, uncertain score propagation by the balance theory may cause false node ranking.

The PNR system 200 may propagate a score of the currently-visiting node $n_y$ to the next-visiting node $n_z$ according to whether each score propagation is trustworthy. A positive score and a negative score of the currently-visiting node may be normalized as the number of outgoing edges of the currently-visiting node. A positive score and a negative score of the currently-visiting node may respectively indicate a degree to which a relationship between the seed node and the currently-visiting node has a positive sign and a negative sign.

Figure 7:
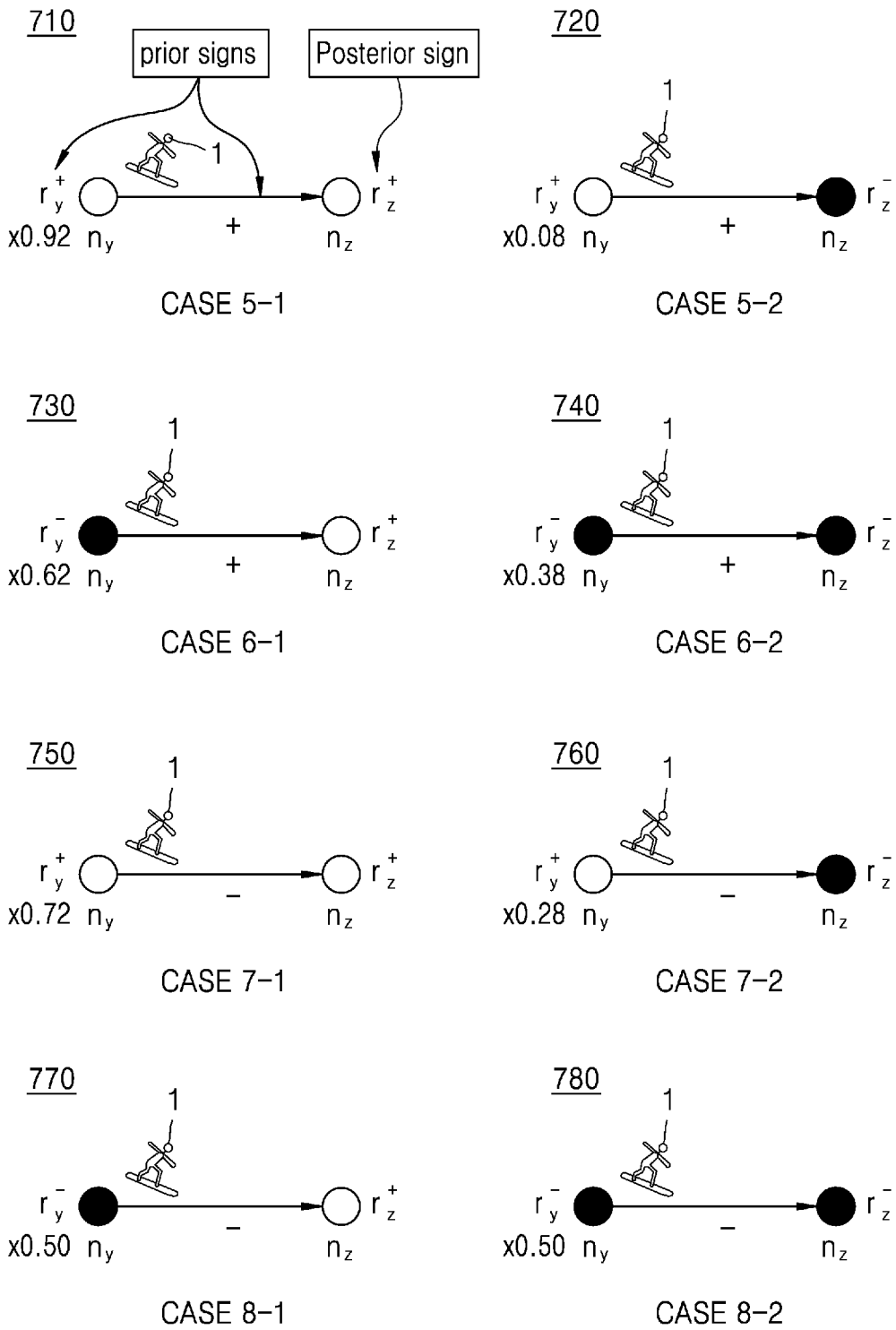
FIG. 7 is a diagram for describing a score propagation method when score propagation is untrustworthy, in an embodiment.

FIG. 7 is a diagram for describing a score propagation method when score propagation is untrustworthy, in an embodiment. For convenience of explanation, it will be described with reference to FIGS. 2 and 6.

The PNR system 200 according to an embodiment may operate differently according to the following eight cases.

CASE 1: score propagation of a positive score of the currently-visiting node to a positive score of the next-visiting node is trustworthy (610, FIG. 6)
 CASE 2: score propagation of a negative score of the currently-visiting node to a negative score of the next-visiting node is trustworthy (620, FIG. 6)
 CASE 3: score propagation of a positive score of the currently-visiting node to a negative score of the next-visiting node is trustworthy (630, FIG. 6)

CASE 4: score propagation of a negative score of the currently-visiting node to a positive score of the next-visiting node is trustworthy (640, FIG. 6)

CASE 5: score propagation of a positive score of the currently-visiting node to a positive score of the next-visiting node is untrustworthy (710 and 720)

CASE 6: score propagation of a negative score of the currently-visiting node to a negative score of the next-visiting node is untrustworthy (730, 740)

CASE 7: score propagation of a positive score of the currently-visiting node to a negative score of the next-visiting node is untrustworthy (750, 760)

CASE 8: score propagation of a negative score of the currently-visiting node to a positive score of the next-visiting node is untrustworthy (770, 780)

When it is determined in a sign verification step that score propagation is trustworthy, the PNR system 200 may propagate a score by using a first score propagation method of performing score propagation based on the balance theory. In contrast, when it is determined in a sign verification step that score propagation is untrustworthy, the PNR system 200 may perform score propagation by using a second score propagation method of performing score propagation based on a ratio between a balanced triangle and an unbalanced triangle.

In CASE 5 (710, 720) or CASE 7 (750, 760), the PNR system 200 may distribute and propagate the positive score $r_y^+$ of the currently-visiting node $n_y$ to the positive score of the next-visiting node $n_z$ (CASE 5-1 (710) or CASE 7-1 (750)) and the negative score $r_z^-$ of the next-visiting node $n_z$ (CASE 5-2 (720) or CASE 7-2 (760)). In CASE 6 (730, 740) or CASE 8 (770, 780), the PNR system may distribute and propagate the negative score $r_y^- r_y^+$ of the currently-visiting node $n_y$ to the positive score $r_z^+$ of the next-visiting node $n_z$ (CASE 6-1 (730) or CASE 8-1 (770)) and the negative score $r_z^-$ of the next-visiting node $n_z$ (case 6-2 (740) or CASE 8-2 (780)).

In this case, a distribution ratio may be determined by using a ratio between a balanced triangle and an unbalanced triangle of a given signed network. In detail, when a sign of a score propagated from the currently-visiting node to the next-visiting node in each dataset (e.g., the positive score $r_y^+$ of the currently-visiting node $n_y$ in CASE 6 or CASE 8, or the negative score $r_y^- r_y^+$ of the currently-visiting node $n_y$ in CASE 6 or CASE 8), and an edge sign between the currently-visiting node and the next-visiting node (e.g., + in CASE 5 (710, 720) or CASE 6 (730, 740), or − in CASE 7 (750, 760) or CASE 8 (770, 780)) are prior signs, a score may be propagated to a positive score of the next-visiting node by a ratio at which a posterior sign is + and may be propagated to a negative score of the next-visiting node by a ratio at which a posterior sign is −. That is, a distribution ratio may be determined for each of four types of a prior sign of a triangle, and when a type of prior signs is a type in which a sign of a score propagated from the currently-visiting node to the next-visiting node and an edge sign between the currently-visiting node and the next-visiting node are the same, a score may be propagated based on the distribution ratio of the type of the prior signs. Each case may be divided into a plurality of sub-cases according to a score propagated to the next-visiting node.

For example, when a positive score of the visiting node is propagated and a predicted edge sign between the currently-visiting node and the next-visiting node is + (i.e., when prior signs are (+, +)), ratios at which a posterior sign is + and − in the Wikipedia dataset of Table 1 are respectively 92% and 8%. In this case, in CASE 5-1 (710), the PNR system 200 may propagate a positive score of the currently-visiting node to a positive score of the next-visiting node by 92%. Likewise, in CASE 5-2 (720), the PNR system 200 may propagate a positive score of the currently-visiting node to a negative score to the next-visiting node by 8%. Likewise, a case where prior signs in CASE 6 through 8 (730~780) are (+, −), (−, +), and (−, −) is similar to a case where prior signs in CASE 5-1 (710) and CASE 5-2 (720) are (+, +), and thus, a description thereof will be omitted. In other words, score information may be propagated at different ratios according to features of a given signed network.

According to an embodiment, the PNR system 200 may filter untrustworthy score propagation, and may propagate a score by referring to statistics of a given network for a corresponding case, thereby minimizing a probability that a false score is to be propagated.

A process by which the PNR system 200 propagates a positive score and a negative score of the currently-visiting node from the currently-visiting node to another node (next-visiting node) through one iteration has been described. In one iteration, each node may propagate a score to its outgoing edge, and each node may receive a score from its incoming edge. A score propagation operation may be performed until positive scores and negative scores of all nodes are converged.

Figure 8:
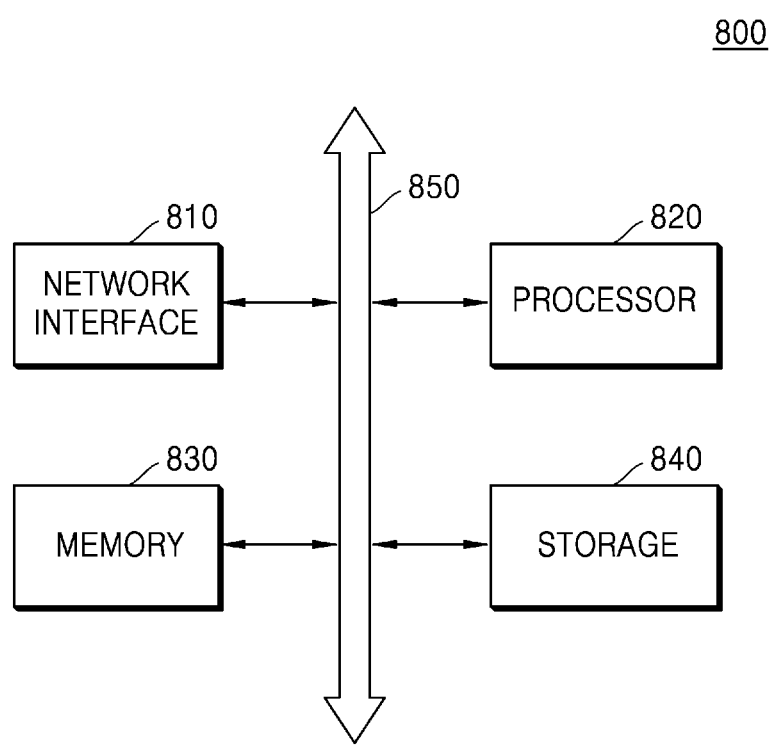
FIG. 8 is a block diagram illustrating a PNR system according to an embodiment.

FIG. 8 is a block diagram illustrating a PNR system according to an embodiment. A configuration and a function of the PNR system 100 (see FIG. 2) of FIGS. 1 through 7 are similar to a configuration and a function of a PNR system 800, and thus, a repeated description will be omitted.

The PNR system 800 may include a network interface 810, a processor 820, a memory 830, and a storage 840. The PNR system 800 may be implemented as at least one electronic device. The electronic device may include any of various electronic devices that may receive power such as a smartphone, a smart pad, a wearable device, a digital camera, a television, a monitor, a laptop computer, a black-box, or a robot.

The network interface 810 may communicate with an external server or external electronic devices. The network interface 810 may be referred to as a transmitter or a receiver according to its function. The network interface 810 may receive various data (e.g., a signed network, a ratio between a balanced triangle and an unbalanced triangle of a network, and a predicted sign of edges that are not directly connected). The network interface 810 may transmit node ranking from the viewpoint of a seed node to the external server or the external electronic devices.

The processor 820 may include hardware components for performing arithmetic, logic, and input/output operations and signal processing. The processor 820 may include at least one of, for example, but not limited to, a central processing unit, a microprocessor, a graphics processing unit, an application processor (AP), an application-specific integrated circuit (ASIC), a digital signal processor (DSP), a digital signal processing device (DSPD), a programmable logic device (PLD), and a field programmable gate array (FPGA). The processor 820 may operate by utilizing an operation space of the memory 830, and may read files for driving an operating system and application execution files from the storage 840. The processor 820 may execute the operating system and various applications.

In an embodiment, one or more processors 820 may be provided. In an embodiment, the processor 820 may be implemented as a dedicated hardware chip for performing artificial intelligence (AI) learning.

The processor 820 may perform at least a part of a function of the node ranking system 100 (see FIG. 2). For example, the processor 820 may predict an edge sign between nodes that are not directly connected in a signed network based on a trained logistic regression classifier model. The processor 820 may output the predicted edge sign, and a confidence score of the predicted edge sign. In an embodiment, the processor 820 may train the logistic regression classifier model based on at least one topological feature.

The processor 820 may perform random walk by a random surfer in a signed network. The processor 820 may allow the random surfer starting from a seed node to walk from a currently-visiting node to a next-visiting node based on a pre-set restart probability. The processor 820 may verify whether propagation of a positive score or a negative score of the currently-visiting node is trustworthy based on the predicted edge sign. When the predicted edge sign and a sign of a score propagated to the next-visiting node are the same (first condition), the processor 820 may determine that the score propagation is trustworthy. In an embodiment, when the first condition is satisfied and the confidence score of the predicted edge sign exceeds a threshold value (second condition), the processor 820 may determine that the score propagation is trustworthy.

When it is determined that score propagation is trustworthy, the processor 820 may propagate a positive score or a negative score of the currently-visiting node to the next-visiting node by using a first score propagation method based on the balance theory. When it is determined that score propagation is trustworthy, the processor 820 may propagate a positive score or a negative score of the currently-visiting node to the next-visiting node by using a second score propagation method based on a ratio between a balanced triangle and an unbalanced triangle of the signed network.

The processor 820 may determine whether positive scores and negative scores of all nodes of the signed network are converged. When it is determined that the scores are not converged, the processor 820 may repeatedly perform random walk by the random surfer. When it is determined that the scores are converged, the processor 820 may end the random walk by the random surfer, and may output node ranking from the viewpoint of the seed node based on values obtained by subtracting the converged negative scores from the converted positive scores of the nodes.

The memory 830 may temporarily store data, firmware, software, and process code processed or to be processed by the processor 820. For example, the memory 830 may store the trained logistic regression classifier model, parameters (e.g., a restart probability of random walk, threshold value information, seed node information, initial value information, and a weight value), a random walk algorithm, etc.

The memory 830 may be used as a main memory device of the PNR system 800. Examples of the memory 830 may include a dynamic random-access memory (DRAM), a static random-access memory (SRAM), a phase-change random-access memory (PRAM), a magnetic random-access memory (MRAM), a ferroelectric random-access memory (FeRAM), and a resistive random-access memory (RRAM). The memory 830 may be referred to as a buffer memory, a working memory, or a cache memory. Although not shown, the number of memories 830 may be one or more.

In an embodiment, the memory 830 may store instructions, an algorithm, a data structure, or program code, related to operations of the sign verifier 210 (see FIG. 2) and the score propagator 220 (see FIG. 2).

The storage 840 may store data related to the operating system or applications, a file for driving the operating system, or a file for executing the applications. For example, the storage 840 may store files for executing the PNR system 800. Examples of the storage 840 may include a flash memory, a phase-change random-access memory (PRAM), a ferroelectric random-access memory (FeRAM), and a resistive random-access memory (RRAM).

A bus 850 may provide a communication path between elements of the PNR system 800. The network interface 810, the processor 820, the memory 830, and the storage 840 may exchange data with one another through the bus 850. The bus 850 may be configured to support various types of communication formats used in the network interface 810.

Figure 9A:
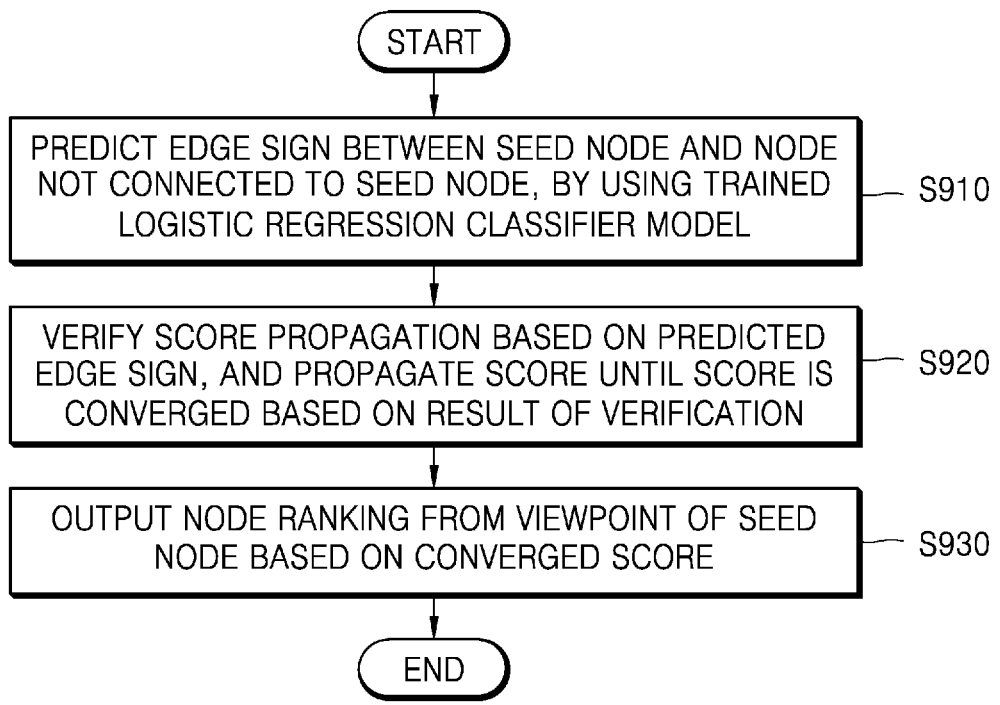
FIG. 9A is a flowchart illustrating a PNR method according to an embodiment.

FIG. 9A is a flowchart illustrating a PNR method according to an embodiment. For convenience of explanation, the same description as that made with reference to FIGS. 1 through 7 will be omitted. For convenience of explanation, FIG. 9 will be described with reference to reference numerals of FIG. 8.

In operation S910, an edge sign between a seed node of a signed network and a node not connected to the seed node may be predicted by the processor 820 by using a trained logistic regression classifier model. The predicted edge sign may be stored in the memory 830 and/or the storage 840. Although a case where an edge sign is predicted by using the trained logistic regression classifier model has been described, the present disclosure is not limited thereto. That is, in the present disclosure, an edge sign may be predicted by using another model capable of predicting an edge sign.

In operation S920, by the processor 820, score propagation may be verified based on a predicted edge sign, and a score may be propagated until a score is converged based on a result of the verification. Detailed steps of operation S920 will be described with reference to FIG. 9B.

In operation S930, by the processor 820, node ranking may be output from the viewpoint of a seed node based on the converged score. In detail, the converged score may include a positive score and a negative score. By the processor 820, node ranking may be output at the seed node based on a value obtained by subtracting the converged negative score from the converged positive score. In an embodiment, by the processor 820 or another electronic device, based on the output node ranking, friend recommendation in a specific network, target marking, product recommendation in an Internet shopping mall, media content (e.g., a movie or drama) in an online streaming service, news recommendation in an online news service, web page search in a search engine, etc. may be performed. However, the present disclosure is not limited thereto, and the node ranking output by the processor 820 or another electronic device may be applied to recommendation technology in an arbitrary network domain.

Figure 9B:
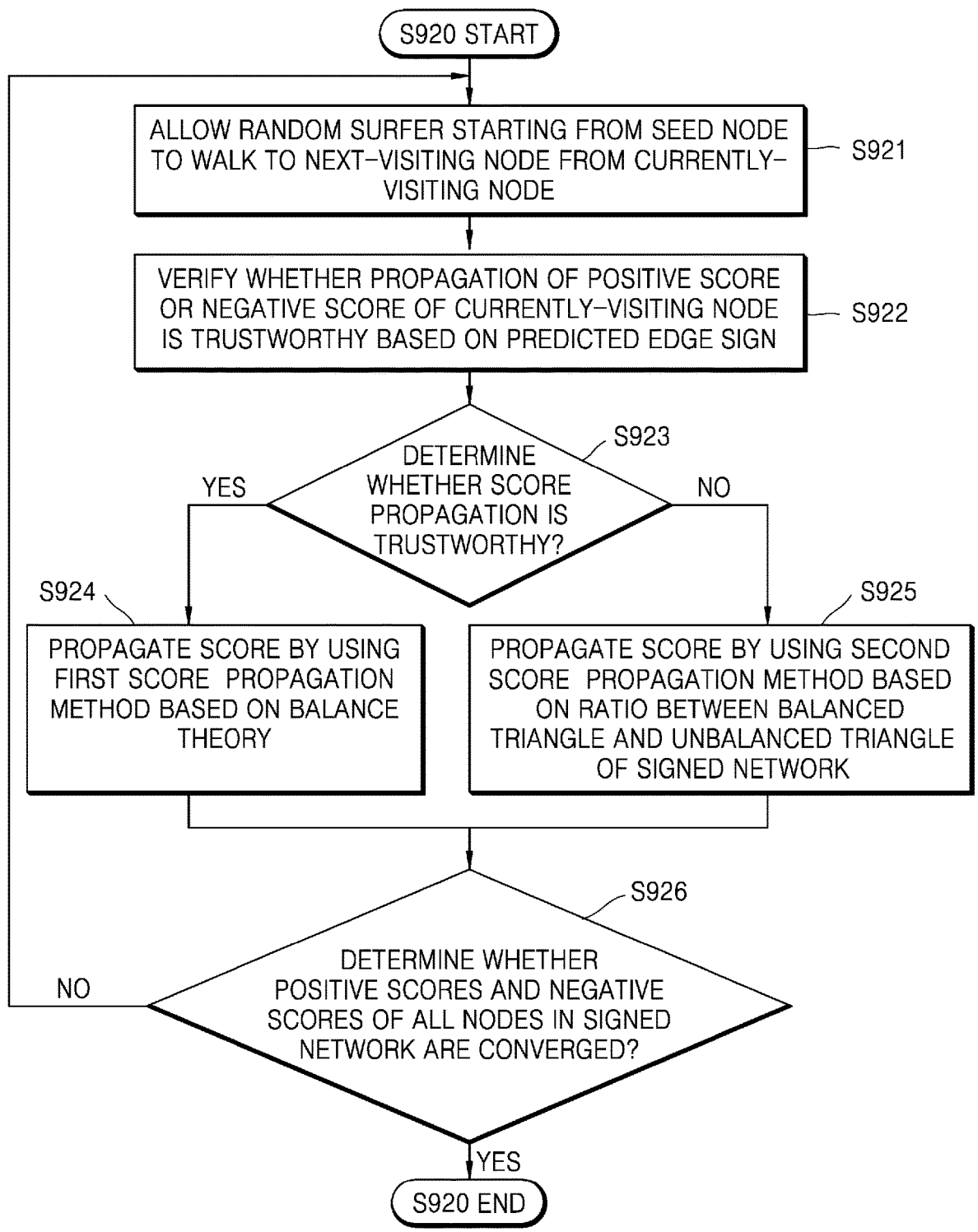
FIG. 9B is a flowchart illustrating detailed steps of operation S920 of FIG. 9A.

FIG. 9B is a flowchart illustrating detailed steps of operation S920 of FIG. 9A. The same description as that made with reference to FIG. 9A will be omitted. For convenience of explanation, FIG. 9B will be described with reference to reference numerals of FIGS. 8 and 9B. In operation S921, by the processor 820, random walk by a random surfer starting from the seed node may be performed. By the processor 820, the random surfer may walk from a currently-visiting node to a next-visiting node. In an embodiment, the random surfer may restart random walk at the seed node based on a pre-determined restart probability. The pre-determined restart probability may be stored in the memory 830.

In operations S922 and S923, by the processor 820, it may be verified whether propagation of a positive score or a negative score of the currently-visiting node is trustworthy based on the predicted edge sign. In an embodiment, the predicted edge sign may correspond to an edge sign between the seed node and the next-visiting node. In an embodiment, when the predicted edge sign and a sign of a score propagated to the next-visiting node from the currently-visiting node are the same (YES), it is determined that score propagation is trustworthy, and the procedure proceeds to operation S924. In contrast, when the predicted edge sign and the sign of the score propagated to the next-visiting node from the currently-visiting node are not the same (NO), it is determined that score propagation is untrustworthy and the procedure proceeds to operation S925. In an embodiment, when the predicted edge sign and the sign of the score propagated to the next-visiting node from the currently-visiting node are the same (first condition) and a confidence score of the predicted edge sign exceeds a threshold value (second condition), it may be determined that score propagation is trustworthy. In this case, when the first condition or the second condition is not satisfied, it may be determined that score propagation is untrustworthy.

In operation S924, by the processor 820, a score may be propagated by using a first score propagation method based on the balance theory.

In operation S925, by the processor 820, a score may be propagated by using a second score propagation method based on a ratio between a balanced triangle and an unbalanced triangle of a signed network. In an embodiment, the ratio between the balanced triangle and the unbalanced triangle of the signed network may be pre-calculated by the processor 820. In an embodiment, by the processor 820, a distribution ratio may be determined based on a ratio at which a triangle satisfying transitivity included in the signed network satisfies the balance theory.

In an embodiment, by the processor 820, a distribution ratio may be determined for each of four types (i.e., (+, +), (+, -), (-, +), and (-, -)) of prior signs of a triangle. In an embodiment, when a type of prior signs (e.g., (+, -)) is a type in which a sign (e.g., +) of a score propagated to the next-visiting node from the currently-visiting node and an edge sign (e.g., -) between the currently-visiting node and the next-visiting node are the same, by the processor 820, a score may be propagated to the next-visiting node based on the distribution ratio of the type of the prior signs.

In operation S926, by the processor 820, it may be determined whether positive scores and negative scores of all nodes included in the signed network are converged. When the positive scores and the negative scores are not converged (YES), the procedure may return to operation S921 to repeatedly perform random walk. When the positive scores and the negative scores are converged (NO), operation S920 ends and the procedure proceeds to operation S930.

The PNR system described above may be implemented as a hardware component, a software component, and/or a combination of a hardware component and a software component. For example, the device and corresponding components according to the above-described embodiments may be realized by using one or more universal computers or special-purpose computers, such as a processor, a controller, an arithmetic logic unit (ALU), a digital signal processor, a microcomputer, a field-programmable gate array (FPGA), a programmable logic unit (PLU), a microprocessor, or any type of device that may execute and respond to instructions. A processing device may execute an operating system (OS) and at least one software application, which is executed within the OS. Additionally, the processing device may respond to the execution of a software application, so as to access, store, manipulate, process, and generate data. In order to facilitate the understanding of the present disclosure, the present disclosure may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configurations, such as parallel processors, are possible.

Software may include a computer program, code, instructions, or a combination thereof, to independently or collectively instruct or configure the processing device to perform desired operations. In order to be interpreted by the processing device, or in order to provide instructions or data to the processing device, the software and/or data may be embodied in any type of machine, a component, physical equipment, virtual equipment, or a computer storage medium or device. The software may be distributed over network-coupled computer systems so that the software is stored and executed in a distributed fashion. The software and data may be stored in one or more computer-readable recording media.

The method according to the embodiment may be embodied as program commands executable by various computer means and may be recorded on a computer-readable recording medium. The computer-readable recording medium may include program commands, data files, data structures, and the like separately or in combinations. The program commands recorded on the computer-readable recording medium may be specially designed and configured for the embodiments or may be well-known to and be usable by one of ordinary skill in the art of computer software. Examples of the computer-readable recording medium include a magnetic medium such as a hard disk, a floppy disk, or a magnetic tape, an optical medium such as a compact disc-read-only memory (CD-ROM) or a digital versatile disc (DVD), a magneto-optical medium such as a floptical disk, and a hardware device specially configured to store and execute program commands such as a read-only memory (ROM), a random-access memory (RAM), or a flash memory. Examples of the program commands include advanced language code that may be executed by a computer by using an interpreter or the like as well as machine language code made by a compiler.

According to an embodiment of the present disclosure, because incorrect sign prediction using the balance theory is corrected, the accuracy of sign prediction may be improved. According to an embodiment of the present disclosure, because a score that may be trustworthy through sign verification is propagated, a probability that a false score is propagated may be minimized. According to an embodiment of the present disclosure, the accuracy of ranking results may be improved and meaningful ranking may be output.

Although the embodiments have been described by the limited embodiments and the drawings as described above, various modifications and variations are possible by one of ordinary skill in the art from the above description. For example, the described techniques may be performed in a different order than the described method, and/or elements of the described electronic device, structure, circuit, etc. may be combined or integrated in a different form than the described method, or may be replaced or substituted by other elements or equivalents to achieve appropriate results.

Accordingly, other realizations, other embodiments, and equivalents to claims may also belong to the scope of the appended claims.

What is claimed is:

1. A personalized ranking method using random walk, the personalized ranking method comprising:
verifying whether propagation of a positive score or a negative score of a currently-visiting node is trustworthy based on an edge sign between a seed node and a next-visiting node predicted by using a classification model, wherein the seed node, the currently-visiting node, and the next-visiting node are included in a signed network; and
when the propagation is trustworthy according to the verification, propagating a score by using a first score propagation method based on balance theory, and when the propagation is untrustworthy according to the verification, propagating a score by using a second score propagation method based on a ratio between a balanced triangle and an unbalanced triangle of the signed network,
wherein each of a plurality of triangles is examined as to whether each of the plurality of triangles follow rules of the balance theory,
wherein, when a first prior sign of a first edge and a second prior sign of a second edge of a first triangle among the plurality of triangles are determined, the first triangle is classified into the balanced triangle or the unbalanced triangle according to a posterior sign of a third edge, and
wherein the verifying whether the propagation of the positive score or the negative score of the currently-visiting node is trustworthy comprises:
when a first condition regarding whether the predicted edge sign is same as a sign of a score propagated from the currently-visiting node to the next-visiting node is satisfied, determining that the score propagation is trustworthy, and
when the first condition is not satisfied, determining that the score propagation is untrustworthy.

2. The personalized ranking method of claim 1, wherein the verifying whether the propagation of the positive score or the negative score of the currently-visiting node is trustworthy further comprises,
when the first condition and a second condition regarding whether a confidence score of the predicted edge sign exceeds a threshold value are satisfied, determining that the score propagation is trustworthy, and when the first condition or the second condition is not satisfied, determining that the score propagation is untrustworthy.

3. The personalized ranking method of claim 1, wherein the classification model is a logistic regression classifier model,
wherein the logistic regression classifier model is trained by using, as an input, feature vector information comprising values corresponding to a plurality of topological features for a node pair with an edge sign.

4. The personalized ranking method of claim 1, wherein the classification model outputs a confidence score of the predicted edge sign.

5. The personalized ranking method of claim 1, wherein the first score propagation method comprises,
when an edge sign between the currently-visiting node and the next-visiting node is + and a positive score of the currently-visiting node is propagated, propagating the positive score of the currently-visiting node to a positive score of the next-visiting node,
when an edge sign between the currently-visiting node and the next-visiting node is + and a negative score of the currently-visiting node is propagated, propagating the negative score of the currently-visiting node to a negative score of the next-visiting node,
when an edge sign between the currently-visiting node and the next-visiting node is − and a positive score of the currently-visiting node is propagated, propagating the positive score of the currently-visiting node to a negative score of the next-visiting node, and
when an edge sign between the currently-visiting node and the next-visiting node is − and a negative score of the currently-visiting node is propagated, propagating the negative score of the currently-visiting node to a positive score of the next-visiting node.

6. The personalized ranking method of claim 1, wherein the second score propagation method comprises,
when a positive score of the currently-visiting node is propagated, distributing and propagating the positive score of the currently-visiting node to a positive score and a negative score of the next-visiting node according to a distribution ratio, and
when a negative score of the currently-visiting node is propagated, distributing and propagating the negative score of the currently-visiting node to a positive score and a negative score of the next-visiting node according to a distribution ratio.

7. The personalized ranking method of claim 6, wherein the distribution ratio is the ratio between the balanced triangle and the unbalanced triangle,
wherein the balanced triangle is a triangle satisfying the balance theory from among triangles satisfying transitivity, and the unbalanced triangle is a triangle not satisfying the transitivity, in the signed network.

8. The personalized ranking method of claim 7, wherein prior signs of the triangle comprise four types comprising (+, +), (+, −), (−, +), and (−, −),
wherein the distribution ratio is determined for each of the four types,
wherein, when a type of the prior signs is a type in which a sign of a score which is propagated from the currently-visiting node to the next-visiting node and an edge sign between the currently-visiting node and the next-visiting node are same, a score is propagated based on the distribution ratio.

9. A personalized node ranking (PNR) system using random walk, the PNR system comprising:
a receiver configured to receive a signed network;
a memory configured to store one or more instructions; and
at least one processor configured to execute the one or more instructions to,
verify whether propagation of a positive score or a negative score of a currently-visiting node is trustworthy based on an edge sign between a seed node and a next-visiting node predicted by using a classification model, and
when the propagation is trustworthy according to the verification, propagate a score by using a first score propagation method based on balance theory, and when the propagation is untrustworthy according to the verification, propagate a score by using a second score propagation method based on a ratio between a balanced triangle and an unbalanced triangle of the signed network, wherein the seed node, the currently-visiting node, and the next-visiting node are included in the signed network, wherein each of a plurality of triangles is examined as to whether each of the plurality of triangles follow rules of the balance theory, wherein, when a first prior sign of a first edge and a second prior sign of a second edge of a first triangle among the plurality of triangles are determined, the first triangle is classified into the balanced triangle or the unbalanced triangle according to a posterior sign of a third edge, and wherein the at least one processor is further configured to execute the one or more instructions to:

when a first condition regarding whether the predicted edge sign is same as a sign of a score propagated to the next-visiting node from the currently-visiting node is satisfied, determine that the score propagation is trustworthy, and when the first condition is not satisfied, determine that the score propagation is untrustworthy.

10. The PNR system of claim 9, wherein the at least one processor is further configured to execute the one or more instructions to allow a random surfer starting from the seed node and performing the random walk to walk from the currently-visiting node to the next-visiting node, repeatedly perform the random walk until positive scores and negative scores of all nodes of the signed network are converged, and output node ranking from a viewpoint of the seed node based on the converged positive scores and the converged negative scores.

11. The PNR system of claim 9, wherein the at least one processor is further configured to execute the one or more instructions to, when the first condition and a second condition regarding whether a confidence score of the predicted edge sign exceeds a threshold value are satisfied, determine that the score propagation is trustworthy, and when the first condition or the second condition is not satisfied, determine that the score propagation is untrustworthy.

12. The PNR system of claim 9, wherein the classification model is a logistic regression classifier model, wherein the logistic regression classifier model is trained by using, as an input, feature vector information comprising values corresponding to a plurality of topological features for a node pair with an edge sign.

13. The PNR system of claim 9, wherein the classification model outputs a confidence score of the predicted edge sign.

14. The PNR system of claim 9, wherein the first score propagation method comprises, when an edge sign between the currently-visiting node and the next-visiting node is + and a positive score of the currently-visiting node is propagated, propagating the positive score of the currently-visiting node to a positive score of the next-visiting node, when an edge sign between the currently-visiting node and the next-visiting node is + and a negative score of the currently-visiting node is propagated, propagating the negative score of the currently-visiting node to a negative score of the next-visiting node, when an edge sign between the currently-visiting node and the next-visiting node is − and a positive score of the currently-visiting node is propagated, propagating the positive score of the currently-visiting node to a negative score of the next-visiting node, and when an edge sign between the currently-visiting node and the next-visiting node is − and a negative score of the currently-visiting node is propagated, propagating the negative score of the currently-visiting node to a positive score of the next-visiting node.

15. The PNR system of claim 9, wherein the second score propagation method comprises, when a positive score of the currently-visiting node is propagated, distributing and propagating the positive score of the currently-visiting node to a positive score and a negative score of the next-visiting node according to a distribution ratio, and when a negative score of the currently-visiting node is propagated, propagating the negative score of the currently-visiting node to a positive score and a negative score of the next-visiting node according to a distribution ratio.

16. The PNR system of claim 15, wherein the distribution ratio is the ratio between the balanced triangle and the unbalanced triangle, wherein the balanced triangle is a triangle satisfying the balance theory from among triangles satisfying transitivity and the unbalanced triangle is a triangle not satisfying the transitivity, in the signed network.

17. The PNR system of claim 16, wherein the at least one processor is further configured to execute the one or more instructions to determine the distribution ratio for each of four types of prior signs of the triangle, and when a type of the prior signs is a type in which a sign of a score propagated from the currently-visiting node to the next-visiting node and an edge sign between the currently-visiting node and the next-visiting node are same, propagate a score based on the distribution ratio, wherein the four types comprise (+, +), (+, −), (−, +), and (−, −).

18. A non-transitory computer-readable recording medium storing a program for executing:

an operation of verifying whether propagation of a positive score or a negative score of a currently-visiting node is trustworthy based on an edge sign between a seed node and a next-visiting node predicted by using a classification model, wherein the seed node, the currently-visiting node, and the next-visiting node are included in a signed network; and an operation of, when the propagation is trustworthy according to the verification, propagating a score by using a first score propagation method based on balance theory, and when the propagation is untrustworthy according to the verification, propagating a score by using a second score propagation method based on a ratio between a balanced triangle and an unbalanced triangle of the signed network, wherein each of a plurality of triangles is examined as to whether each of the plurality of triangles follow rules of the balance theory, wherein, when a first prior sign of a first edge and a second prior sign of a second edge of a first triangle among the plurality of triangles are determined, the first triangle is classified into the balanced triangle or the unbalanced triangle according to a posterior sign of a third edge, and wherein the operation of the verifying whether the propagation of the positive score or the negative score of the currently-visiting node is trustworthy comprises:
an operation of, when a first condition regarding whether the predicted edge sign is same as a sign of a score propagated from the currently-visiting node to the next-visiting node is satisfied, determining that the score propagation is trustworthy, and
an operation of, when the first condition is not satisfied, determining that the score propagation is untrustworthy.

* * * * *